Patented Aug. 6, 1935

2,010,746

UNITED STATES PATENT OFFICE 2,010,746

AZO-DYESTUFFS AND PROCESS OF MAKING SAME

Gérald Bonhôte and Jakob Danuser, Basel, Switzerland, assignors to the firm of Society of Chemical Industry in Basle, Basel, Switzerland No Drawing. Application January 23, 1935, Serial No. 3,191. In Switzerland January 30, 1934

9 Claims. (Cl. 260—95)

This invention relates to the manufacture of new dyestuffs which are characterized by the brilliancy of their dyeings and other valuable dyeing properties, by coupling a diazo-compound derived from an amine of the general formula

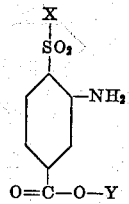

in which X represents alkyl, aralkyl or aryl and Y represents alkyl, with a coupling component. According to the choice of the coupling component, various dyestuffs are obtained. These new dyestuffs correspond to the general formula

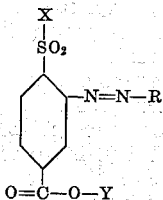

in which X and Y have the meaning indicated above and R represents the radical of the coupling component used. With pyrazolone-sulfonic acids, naphthol-sulfonic acids, aminonaphthol-sulfonic acids, particularly the N-acyl-derivatives of 1,8-aminonaphtholsulfonic acids, such as N-acetyl- or N-parasulfotolyl derivatives of 1-amino-8-hydroxynaphthalene-3,6-disulfonic acid, wool dyestuffs are obtained; with suitable derivatives of 2-amino-5-hydroxynaphthalene-7-sulfonic acid or coupling components which contain the triazine ring, cotton dyestuffs are obtained; whereas with non-sulfonated coupling components, pigment dyestuffs are obtained. Such non-sulfonated coupling components are the arylides of acetoacetic acid, benzoylacetic acid or terephthaloyl-bis-acetic acid; also arylides of carboxylic acids of hydroxybenzenes, hydroxynaphthalenes, hydroxycarbazoles, hydroxynaphthocarbazoles, hydroxyanthracenes and hydroxyphenanthrenes. Such arylides are described in large number in the pertinent literature. Particularly valuable are the dyeings produced on the fibre by means of these said non-sulfonated coupling components, particularly those obtained with the arylides of 2,3-hydroxynaphthoic acid. The dyestuffs thus obtained correspond to the general formula

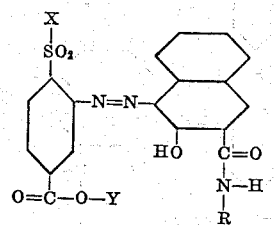

in which R represents an aromatic radical of the benzene or naphthalene series, and X and Y have the meaning already indicated above, and dye the animal fiber vivid orange to scarlet tints which are characterized by their purity and very good properties of fastness. When dry they are red to orange colored powders which are insoluble in water.

The following examples illustrate the invention:—

Example 1

30.5 parts by weight of the ethylester of 2-amino-4-carboxylic acid-4'-methyl-1,1'-diphenylsulfone are diazotized in the usual manner. The clear diazo-solution thus obtained is introduced into a solution consisting of 29.7 parts of 2,3-hydroxynaphthoic acid-orthochloranilide, 60 parts of sodium hydroxide solution of 30 per cent. strength, 15 parts of sodium carbonate and 2000 parts of water. The dyestuff formed is precipitated immediately; the orange precipitate is filtered and dried. The new dyestuff very probably corresponds to the formula

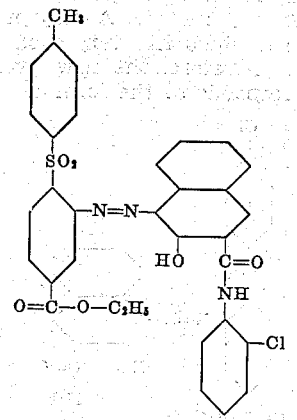

Similar dyestuffs are obtained by substituting other esters, for instance methylester, butylester, propylester or isopropylester for the ethylester of 2-amino-4-carboxylic acid-4'-methyl-1,1'-diphenylsulfone.

Example 2

Cotton yarn is grounded with a solution of 7 grams of the 2,3-hydroxynaphthoic acid-meta-toluidide in 300 cc. of hot water, to which has been added 12 cc. of sodium hydroxide solution of 30 per cent. strength, 10 cc. of Turkey red oil and water to make 1 litre. The yarn is then wrung out and developed in a diazo-solution, buffered with sodium acetate, and containing per litre the diazo-compound corresponding with 2 grams of the ethyl-ester of 2-amino-4-carboxylic acid-4'-methyl-1,1'-diphenylsulfone. There is produced a pure orange of excellent properties of fastness. Therefore the new dyestuff very probably corresponds to the formula

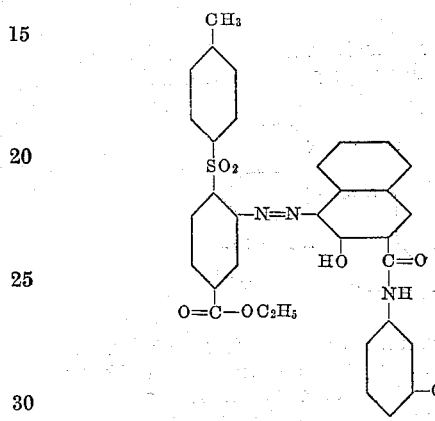

Similar orange tints are obtained, for instance, with the anilide, the para-chloranilide, the ortho-anisidide, the para-toluidide, the meta-nitranilide, the 5-chloro-2-toluidide, the meta-chloranilide, the 3,4-dichloranilide, the meta-xylidide of the 2,3-hydroxynaphthoic acid. Scarlet tints are obtained with the α-naphthalide of the 2,3-hydroxynaphthoic acid.

*Example 3*

Cotton yarn is impregnated with a solution of 5.5 grams of 2,3-hydroxynaphthoic acid-para-chloranilide, 12 cc. of sodium hydroxide solution of 30 per cent. strength and 10 cc. of Turkey red oil. After being wrung out, the dyestuff is developed by means of a diazo-solution, buffered with sodium acetate and containing the diazo-compound corresponding with 2 grams of the ethylester of 2-amino-4-carboxylic acid-4'-chloro-1,1'-diphenylsulfone, per litre. The yarn is then rinsed and soaped. A very pure orange tint is obtained which has very good properties of fastness. Therefore, the new dyestuff very probably corresponds to the formula

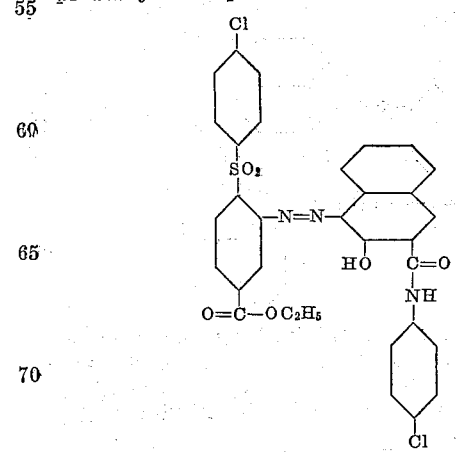

Similar tints are obtained with other arylides of 2,3-hydroxynaphthoic acid, for instance the β-naphthalide or the 3,4-dichloranilide of 2,3-hydroxynaphthoic acid.

Yellow orange tints are obtained with the ortho- and meta-toluidides, the ortho- and meta-chloranilides and the 2,5-dichloranilide.

*Example 4*

The fabric to be printed is foularded with an alkaline solution containing per litre 14 grams of 2,3-hydroxynaphthoic acid-anilide. After drying, it is printed with a printing color containing, per kilo 12 grams of diazotized ethylester of 2-amino-4-carboxylic acid - 1,1' - diphenylsulfone. The deep, pure orange dyeing develops very quickly and is of excellent fastness. Therefore, the new dyestuff very probably corresponds to the formula

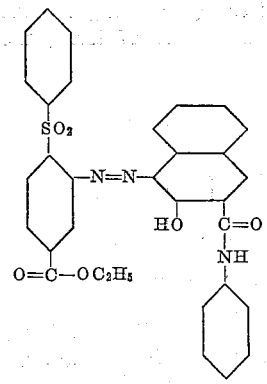

Like tints are obtained with the meta- and para-chloranilides, the para-toluidide, the meta-nitranilide, the 5-chloro-2-toluidide and the 3,4-dichloranilide, the β-naphthalide, the ortho- and para-anisidide and the para-phenetidide of 2,3-hydroxynaphthoic acid.

If in the foregoing examples the specified arylide of 2,3-hydroxynaphthoic acid is exchanged for, say, the di-(acetoacetyl)-ortho-ortho'-tolidide, the terephthaloyl-bis-(acetic acid-2,4-dimethoxy-5-chloroanilide), the benzoyl-acetic acid-ortho-chlor-anilide, pure yellow tints are obtained of excellent properties of fastness.

What we claim is:—

1. The azo-dyestuffs of the general formula

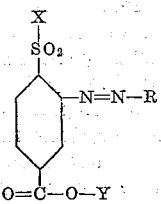

in which X represents aryl, Y represents alkyl and R represents the radical of a coupling component.

2. The azo-dyestuffs of the general formula

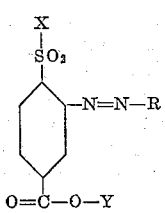

in which X represents aryl, Y represents alkyl and R represents the radical of an unsulfonated coupling component.

3. The azo-dyestuffs of the general formula

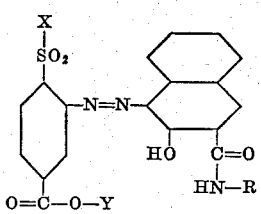

in which X represents aryl, Y represents alkyl and R represents an aromatic nucleus of the benzene or naphthalene series, which products are red to orange colored powders insoluble in water and dyeing cotton vivid yellow-orange to scarlet tints of very good properties of fastness.

4. The azo-dyestuffs of the general formula

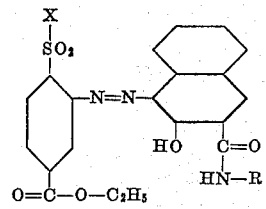

in which X represents aryl and R represents an aromatic nucleus of the benzene or naphthalene series, which products are red to orange colored powders insoluble in water and dyeing cotton vivid yellow-orange to scarlet tints of very good properties of fastness.

5. The azo-dyestuffs of the general formula

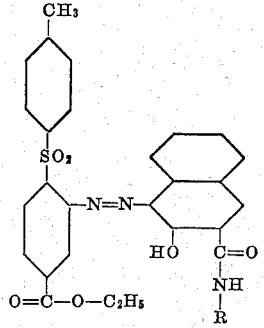

in which R represents an aromatic nucleus of the benzene or naphthalene series, which products are red to orange colored powders insoluble in water and dyeing cotton vivid yellow-orange to scarlet tints of very good properties of fastness.

6. The azo-dyestuffs of the general formula

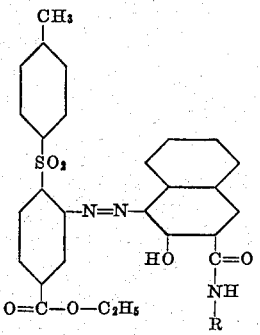

in which R represents an aromatic nucleus of the benzene series, which products are red to orange colored powders insoluble in water and dyeing cotton vivid yellow-orange to scarlet tints of very good properties of fastness.

7. The azo-dyestuff of the formula

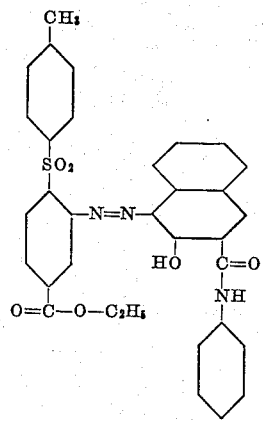

which represents an orange colored powder insoluble in water and dyeing cotton vivid orange tints of very good properties of fastness.

8. The azo-dyestuff of the formula

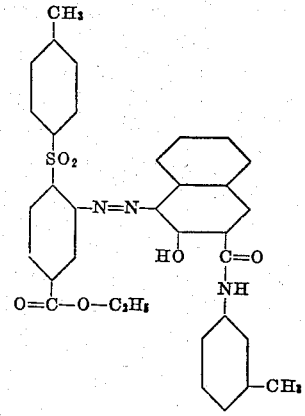

which represents an orange colored powder insoluble in water and dyeing cotton vivid orange tints of very good properties of fastness.

9. The azo-dyestuff of the formula

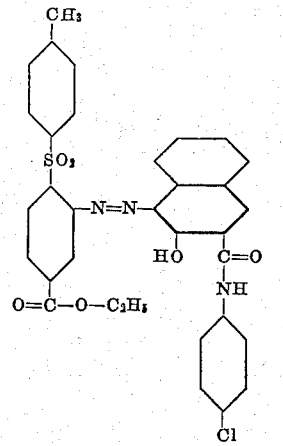

which represents an orange colored powder insoluble in water and dyeing cotton vivid orange tints of very good properties of fastness.

GÉRALD BONHÔTE.
JAKOB DANUSER.